3,077,636
INJECTION MOLDING OF PLASTIC MATERIALS
Donald L. Peters, Bartlesville, Okla., assignor to Phillips Petroleum Company, a corporation of Delaware
Filed Oct. 6, 1959, Ser. No. 844,750
4 Claims. (Cl. 18—30)

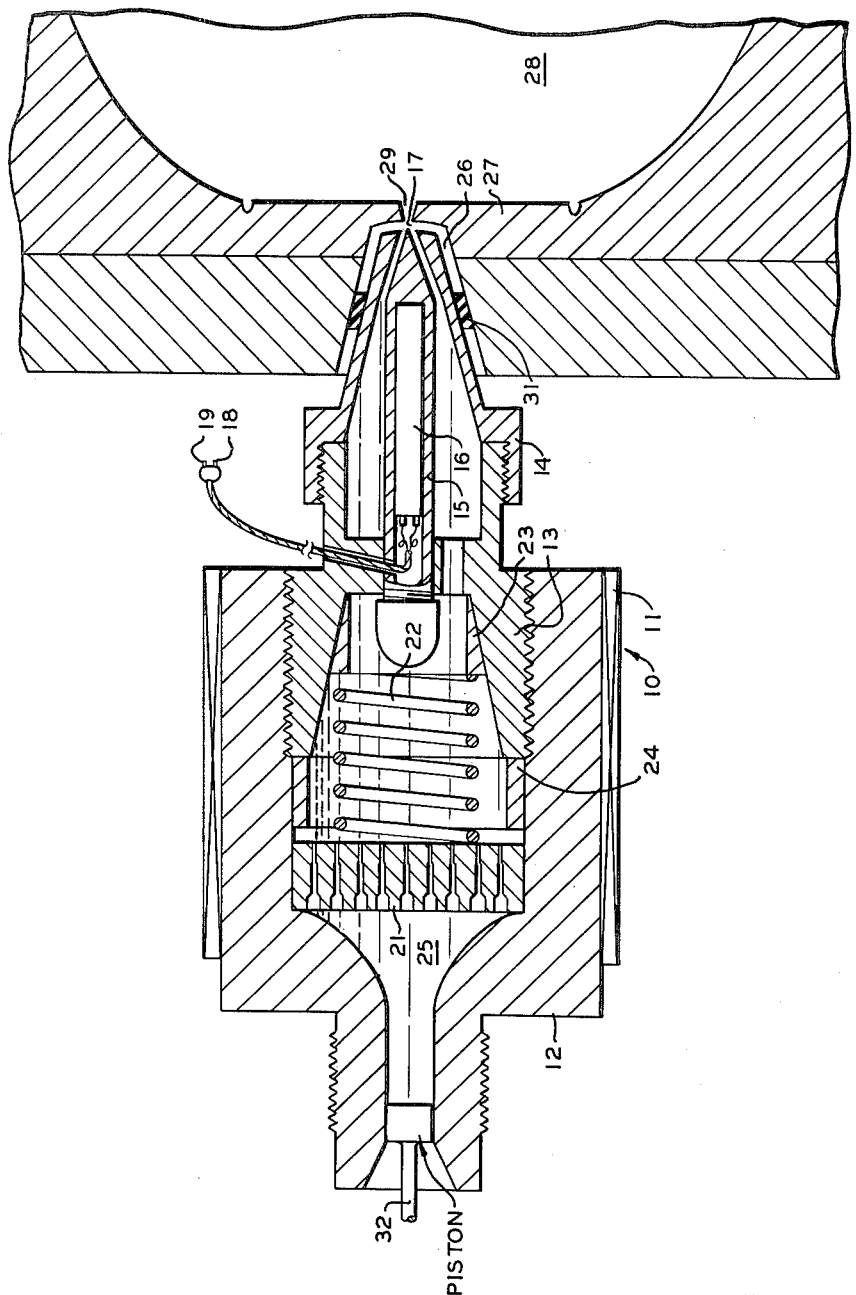

This invention relates to the injection molding of thermoplastic materials.

Conventional molding apparatus of the injection type usually include an injection or heating cylinder having associated therewith an injection plunger or piston. The injection plunger reciprocates in the bore of the heating cylinder in such a manner as to allow the solid plastic material to be molded to enter the cylinder on the withdrawal stroke of the plunger. On the compression stroke of the plunger, the plastic material, now in a molten state, is forced from the injection cylinder through a nozzle and thence through runners or passages and sprues into cavities of the mold. It has been found to be desirable to provide for the precompression of the molten plastic material prior to its injection into the mold cavities in order to ensure that the plastic material completely fills the mold cavities in a minimum of time. In one arrangement of apparatus shown in the prior art, this precompression of the molten material is accomplished by the utilization of separate valves at each of the mold gates. This type of apparatus is quite complicated and is relatively expensive insofar as its original cost as well as its maintenance costs are concerned.

It is, therefore, a principle of this invention to provide an improved means for the injection molding of plastic materials wherein the requirement for valves in the injection nozzle is eliminated.

An object of the invention is to provide an injection molding nozzle wherein the precompressed molten plastic material is decompressed in the nozzle prior to opening the mold. A further object of this invention is the provision of an injection molding nozzle wherein "drooling" or "spewing" of molten plastic material from the injection nozzle at the conclusion of the molding operation is eliminated. It is also an object of this invention to provide an injection molding nozzle wherein a valve is not required to stop the flow of molten plastic material from the nozzle at the conclusion of the molding operation.

Other objects and advantages of the invention will be apparent to one skilled in the art upon study of this disclosure including the detailed description of the invention and the appended drawing wherein:

The single FIGURE of the drawing is a cross-sectional view of the nozzle and adjacent portions of the injection molding apparatus of this invention.

The injection molding apparatus comprises a heating means, means for discharging molten plastic material under pressure from the heating means, a mold having formed therein a sprue which is in communication with the discharge means and means for exerting pressure upon the molten plastic material so that the molten plastic material enters the mold cavity in a precompressed state. The invention broadly resides in the improvement which comprises a spring-loaded floating breaker plate which is forced toward the discharge end of the nozzle against the spring tension while the molten plastic under pressure is flowing into the mold cavity and which is forced away from the discharge end of the nozzle by the compressed polymer in the nozzle tip and by the action of the spring at the completion of the molding operation so as to decompress the molten plastic remaining in the nozzle tip. The apparatus of this invention makes it possible to obtain the desired precompression of the molten plastic material in the heating means and in the nozzle and at the same time prevents drooling of the molten material from the nozzle tip after the molding operation is completed without the necessity of having a valve located in the nozzle. As compared to the prior art apparatus employing positive closing valves in the nozzle, the apparatus of this invention is simplified in its construction and makes possible a great reduction in maintenance cost.

The materials which are molded in accordance with the present invention can be broadly defined as being thermoplastic synthetic resins. The invention is particularly applicable to materials which can be described as high density, highly crystalline solid polymers although low density, low crystallinity polymers can also be employed. The high density, highly crystalline solid polymers often have an inherent viscosity of at least 0.8, preferably an inherent viscosity between 1.2 and about 10, as determined from a solution of 0.1 gram of polymer in 500 cc. of tetralin at 150° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science, 10, 503 [1953]), using a sample of polymer which is in a state approaching equilibrium at 25° C. An approach to this equilibrium state can be achieved by heating the polymer sample to a temperature of about 50° C. above its crystalline melting point, maintaining the sample at this temperature for about one hour, and then cooling to 25° C. at a rate characterized by a fall of about 1.5° C. per minute at 145° C. The softening point of the polymer varies with the particular polymer used, increasing as the density and crystallinity of polymer increases. Generally, the softening point of the high density solid polymer is about 250° F., preferably in the approximate range of 250 to 300° F., and is several degrees higher, e.g., about 10° F. higher, than the melting point of the polymer.

Highly crystalline polymers having the above-described properties are preferably produced by the method described in U.S. Patent No. 2,825,721 of J. P. Hogan and R. L. Banks, issued on March 4, 1958. As described in detail in the Hogan and Banks patent, the polymers to be molded in accordance with the present invention can be produced by contacting an aliphatic 1-olefin with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia and thoria. It is preferred that the plastic materials which are to be molded in accordance with this invention be polymers of ethylene or propylene or mixtures of ethylene and other unsaturated hydrocarbons, e.g., mixtures of ethylene with minor amounts of monoolefins containing up to and including six carbon atoms per molecule, such as propylene, 1-butene and 1-pentene.

While it is preferred to use in the practice of this invention polymers produced in accordance with the Hogan and Banks process, it is to be understood that polymers produced by other methods can also be utilized. For example, a polymer which can be advantageously used can be produced by contacting an olefin, such as ethylene or propylene, with a catalyst comprising a mixture of an organometallic compound, such as an aluminum trialkyl, and a halide of a group IV metal of the periodic table, such as titanium tetrachloride. In another method for producing a suitable polymer, an olefin, such as ethylene, is polymerized in the presence of a catalyst comprising an organo-metallic halide, such as ethylaluminum dichloride, and a halide of a group IV metal, such as titanium tetrachloride. Although it is usually preferred to utilize the above-mentioned polymers, it is to be understood that the invention is broadly applicable to the molding of thermoplastic materials and that polymers such as polystyrene, polyvinyl chloride, copolymers of vinyl chloride and vinylidene chloride, nylon, and the like, can be utilized in the practice of the invention.

Referring now to the drawing, the injection molding nozzle indicated at 10 includes an external heating element 11 surrounding cylinder 12, insert 13 and nozzle tip 14. An internal heater 15 containing heating element 16 is secured to insert 13 and projects to the discharge orifice 17 of the nozzle tip 14 so as to form an annular discharge opening in the nozzle tip 14. Leads 18 and 19 supply electrical energy to the heater 16 from a source (not shown). Breaker plate 21 is positioned in an enlargement of the axial opening through cylinder 12. Compression spring 22 is positioned between breaker plate 21 and a shoulder 23 situated on the inner surface of insert 13. A shoulder 24 positioned on the inner surface of the axial enlargement of cylinder 12 arrests the forward motion of breaker plate 21, after a short distance of travel, when plastic material is supplied to the nozzle 10 via passageway 25 under pressure so as to overcome the strength of the compression spring 22.

The nozzle 10 is illustrated with nozzle tip 14 inserted in sprue 26 of runner plate 27 and communicating with mold cavity 28 through sprue 29. The nozzle tip 14 is sealed in sprue 26 by means of sealing means 31.

In the operation of the nozzle of this invention as illustrated in the drawing, the breaker plate 21 is in the position shown and as the molten plastic material is forced through passageway 25 and the openings of breaker plate 21, the breaker plate is moved against the compression of spring 22 until the breaker plate rests against shoulders 24. Molten plastic material flows through the nozzle and into the mold cavity until the mold cavity is filled and the pressure equalizes. The plastic material cools and solidifies rapidly in the mold cavity but remains fluid in the nozzle due to the heat applied through heaters 11 and 16. When the pressure on the material in passageway 25 is released, spring 22 forces breaker plate 21 back into the position shown in the drawing, thus reducing the pressure on the molten material in the nozzle 10 downstream from breaker plate 21 so that there is no tendency for fluid plastic material to drool or ooze from the discharge end of the nozzle tip 14. The openings in the breaker plate are quite small, e.g., 0.02 to 0.03 inch diameter, to insure that the polymer will be plasticized before passing into the mold. Due to the viscosity of the molten polymer a substantial pressure is required to force polymer through the openings in the breaker plate so the action of the compressed polymer and of the spring forcing the breaker plate back into the nozzle decompresses the polymer in the nozzle tip.

The following example will aid in a more complete understanding of the invention; however, the example is intended to illustrate and should not be construed to limit the invention.

*Example*

In an injection molding apparatus wherein a pressure of 20,000 p.s.i. was employed to move a high density, highly crystalline polymer of ethylene into a mold, a nozzle according to the illustration in the drawing was employed wherein the breaker plate had 170 holes of 0.03 inch diameter. The area of the orifice at the discharge end of the nozzle tip was 0.05 inch and the clearance between the breaker plate and the cylinder wall was 0.02 inch, and the free travel of the breaker plate along axis of the nozzle was about ⅛ inch. The injection stroke forced the breaker plate against the shoulder 24 so that the polymer flowed through the breaker plate and into the mold cavity. Simultaneously with the retraction of the injection ram following the filling of the cavity, the pressure from the compressed polymer caused the breaker plate to return toward the position shown in the drawing until the opposing polymer pressures attained equilibrium. The heavy spring 22 exerted an additional force to reduce further the pressure within the nozzle by increasing the internal volume of the nozzle through backward movement of the breaker plate.

The heavy spring also counteracts any resistance of the breaker plate to movement because of the viscosity or friction of the molten polymer.

Prior art nozzles employing a check valve to stop the forward flow of polymer after the injection stroke failed to prevent drooling of polymer from the nozzle tip; however, the nozzle of the present invention has been used continuously in this service and leakage of polymer from the nozzle tip is substantially eliminated.

Reasonable variations and modifications are possible within the scope of this disclosure without departing from the spirit and scope of the invention.

That which is claimed is:

1. An injection molding apparatus comprising a heated cylinder having an exit end and an entrance end; a breaker plate containing a plurality of passageways therethrough to provide continuous communication between the exit end and the entrance end of said cylinder, mounted in said cylinder in sliding relationship with said cylinder; means to confine the sliding movement of said breaker plate within predetermined limits; a nozzle mounted in one end of said cylinder and; a compression spring mounted between said nozzle and said breaker plate.

2. An injection molding nozzle comprising a heated cylinder having an entrance end and an exit end through which molten plastic is forced; a breaker plate containing a plurality of axial passageways therethrough to provide continuous communication between said entrance end and said exit of said cylinder, positioned slidably in said cylinder; seat means in said cylinder between said breaker plate and said exit end; spring means to maintain said breaker plate adjacent the entrance end of said cylinder when molten plastic is not being forced through said cylinder and breaker plate and to allow said breaker plate to slide to said seat when molten plastic is forced through said cylinder and breaker plate; and a nozzle tip attached to the exit end of said cylinder.

3. In an injection molding device comprising a heating means, means for forcing molten plastic material through said heating means, and a mold having a sprue in communication with the discharge end of said heating means, apparatus comprising a spring loaded, perforated breaker plate, containing a plurality of passageways therethrough to provide continuous communication through said heating means, positioned slidably in said heating means so as to slide forward against the compression of said spring as molten plastic is forced through said heating means and breaker plate and to return to its former position when molten plastic is not forced through said heating means and breaker plate thereby decompressing molten plastic in said heating means.

4. An injection molding device comprising a heated cylinder having an inlet end and an outlet end through which molten thermoplastic material is forced; a breaker plate containing a plurality of axial passageways therethrough to provide continuous communication between said inlet end and sail outlet end of said cylinder and to allow only molten material to pass therethrough, mounted in said cylinder and slidable parallel with the axis of said cylinder; seat means to confine the sliding movement of said breaker plate within predetermined limits; a nozzle mounted in the outlet end of said cylinder; heating means mounted axially in said nozzle; and means to allow said breaker plate to slide to said seat means nearest the nozzle when molten material is forced through said cylinder and said nozzle and to return said breaker plate to said seat means furthest from said nozzle when molten material is not being forced through said cylinder and said nozzle.

References Cited in the file of this patent

UNITED STATES PATENTS

| | | |
|---|---|---|
| 2,253,460 | Hempel | Aug. 19, 1941 |
| 2,271,063 | DeMattia | Jan. 27, 1942 |
| 2,345,917 | Coffman | Apr. 14, 1944 |
| 2,426,651 | Stacy | Sept. 2, 1947 |
| 2,500,401 | Cossette | Mar. 14, 1950 |
| 2,535,436 | Maynard | Dec. 26, 1950 |
| 2,558,026 | Wilson | June 26, 1951 |
| 2,579,809 | Fellows et al. | Dec. 25, 1951 |
| 2,277,164 | Strahm | Jan. 15, 1957 |
| 2,834,992 | Jupa | May 20, 1958 |
| 2,872,705 | Labarre | Feb. 10, 1959 |

FOREIGN PATENTS

| | | |
|---|---|---|
| 1,016,816 | France | Sept. 3, 1952 |
| 1,181,577 | France | Jan. 12, 1959 |
| 606,879 | Great Britain | Aug. 23, 1948 |

UNITED STATES PATENT OFFICE
CERTIFICATE OF CORRECTION

Patent No. 3,077,636                                February 19, 1963

Donald L. Peters

It is hereby certified that error appears in the above numbered patent requiring correction and that the said Letters Patent should read as corrected below.

Column 4, line 30, for "and;" read -- ; and --; line 38, after "exit" insert -- end --; line 66, for "sail" read -- said --.

Signed and sealed this 24th day of September 1963.

(SEAL)
Attest:

ERNEST W. SWIDER
Attesting Officer

DAVID L. LADD
Commissioner of Patents